(12) United States Patent
Xue et al.

(10) Patent No.: US 11,163,042 B2
(45) Date of Patent: Nov. 2, 2021

(54) SCANNED BEAM DISPLAY WITH MULTIPLE DETECTOR RANGEFINDING

(71) Applicant: Microvision, Inc., Redmond, WA (US)

(72) Inventors: Bin Xue, Mukilteo, WA (US); P. Selvan Viswanathan, Bellevue, WA (US); Robert James Jackson, Monroe, WA (US); George Thomas Valliath, Winnetka, IL (US)

(73) Assignee: Microvision, Inc., Redmond, WA (US)

( * ) Notice: Subject to any disclaimer, the term of this patent is extended or adjusted under 35 U.S.C. 154(b) by 953 days.

(21) Appl. No.: 15/615,045

(22) Filed: Jun. 6, 2017

(65) Prior Publication Data
US 2018/0348347 A1    Dec. 6, 2018

(51) Int. Cl.
| | |
|---|---|
| *G01C 3/08* | (2006.01) |
| *G01S 7/4865* | (2020.01) |
| *G01S 7/481* | (2006.01) |
| *G01S 7/48* | (2006.01) |
| *G01S 17/10* | (2020.01) |
| *G01S 17/42* | (2006.01) |
| *G01S 17/00* | (2020.01) |

(52) U.S. Cl.
CPC .......... *G01S 7/4865* (2013.01); *G01S 7/4808* (2013.01); *G01S 7/4817* (2013.01); *G01S 17/003* (2013.01); *G01S 17/10* (2013.01); *G01S 17/42* (2013.01); *G06K 2209/401* (2013.01)

(58) Field of Classification Search
CPC .... G01S 7/4865; G01S 7/4808; G01S 7/4817; G01S 17/003; G01S 17/10; G01S 17/42; G06K 2209/401
See application file for complete search history.

(56) References Cited

U.S. PATENT DOCUMENTS

| | | | | |
|---|---|---|---|---|
| 5,793,491 | A * | 8/1998 | Wangler | G08G 1/04 356/613 |
| 7,609,875 | B2 | 10/2009 | Liu et al. | |
| 8,446,571 | B2 | 5/2013 | Fiess et al. | |
| 9,098,931 | B2 | 8/2015 | Shpunt et al. | |
| 9,267,787 | B2 | 2/2016 | Shpunt | |
| 9,651,417 | B2 | 5/2017 | Shpunt et al. | |
| 9,677,878 | B2 | 6/2017 | Shpunt et al. | |
| 9,874,441 | B1 * | 1/2018 | Hines | G01S 17/10 |
| 2005/0273564 | A1 * | 12/2005 | Lakshmanamurthy | G06F 13/1694 711/158 |
| 2012/0035934 | A1 * | 2/2012 | Cunningham | G06F 3/013 704/260 |

(Continued)

FOREIGN PATENT DOCUMENTS

JP    2015135271    7/2015

OTHER PUBLICATIONS

Microvision, Inc., , "ISR and Written Opinion".

*Primary Examiner* — Samantha K Nickerson
(74) *Attorney, Agent, or Firm* — Kevin D. Wills

(57) ABSTRACT

A scanning display system includes two detectors for rangefinding. Round trip times-of-flight are measured for reflections of laser pulses received at the detectors. A proportional correction factor is determined based at least in part on the geometry of the scanning display system. The proportional correction factor is applied to the measured times-of-flight to create estimates of more accurate times-of-flight.

20 Claims, 15 Drawing Sheets

(56) References Cited

U.S. PATENT DOCUMENTS

| | | | |
|---|---|---|---|
| 2013/0107000 A1* | 5/2013 | Xue | G01S 17/89 |
| | | | 348/46 |
| 2013/0208257 A1* | 8/2013 | Dyer | G01S 7/4876 |
| | | | 356/4.01 |
| 2014/0104592 A1 | 4/2014 | Tien | |
| 2015/0192677 A1 | 7/2015 | Yu et al. | |
| 2016/0195386 A1 | 7/2016 | Yoon et al. | |
| 2017/0068393 A1 | 3/2017 | Viswanathan | |
| 2017/0070714 A1 | 3/2017 | Honkanen et al. | |
| 2017/0090032 A1 | 3/2017 | Ridderbusch | |
| 2017/0090034 A1 | 3/2017 | Ridderbusch | |
| 2017/0090580 A1 | 3/2017 | Pothier | |
| 2017/0153319 A1 | 6/2017 | Villeneuve et al. | |
| 2017/0176596 A1 | 6/2017 | Shpunt et al. | |
| 2017/0205873 A1 | 7/2017 | Shpunt et al. | |
| 2017/0244955 A1 | 8/2017 | Shpunt et al. | |

\* cited by examiner

SCANNED BEAM DISPLAY WITH MULTIPLE DETECTOR RANGEFINDING

FIELD

The present invention relates generally to scanned beam display systems, and more specifically to rangefinding in scanned beam display systems.

BACKGROUND

Measuring time-of-flight of laser pulses for range finding is generally known, but limitations exist. For example, measurement errors result in inaccurate distance measurements.

FIGS. 1 and 2 show operation of a prior art rangefinding apparatus. Rangefinder 110 measures the distance to target 140 by sending an outgoing laser pulse 112 and receiving a return laser pulse 114 reflected by the target. The round trip time-of-flight (TOF) of the outgoing laser pulse 112 and return laser pulse 114 is measured by rangefinder 110 to determine the distance between rangefinder 110 and target 140.

As shown in FIG. 2, the TOF is typically measured by detecting when the instantaneous amplitude of return laser pulse 114 exceeds a fixed detector amplitude setpoint. This introduces TOF errors based on variations in the return pulse amplitude. For example, a large amplitude return pulse will result in a shorter TOF measurement than will a small amplitude return pulse. Variations in return pulse amplitude may be caused by many factors, including the distance to, and the reflectance of, the target.

A typical rangefinding system may produce a single Gaussian shaped laser pulse with a pulse width in the range of 5 to 10 nanoseconds (ns) full width half maximum (FWHM). The return laser pulse typically maintains a similar pulse shape; however the reflected optical intensity may vary more than 120 dB depending on the distance to, and reflectance of, the target. When using a fixed amplitude setpoint as shown in FIG. 2, a typical timing error may be on the order of a few nanoseconds, which is equivalent to a distance uncertainty of ~500 mm (a 3.3 ns time-of-flight corresponds to a 500 mm round trip). For some measurement applications, this level of uncertainty is unacceptable.

DESCRIPTION OF EMBODIMENTS

Figure 1:
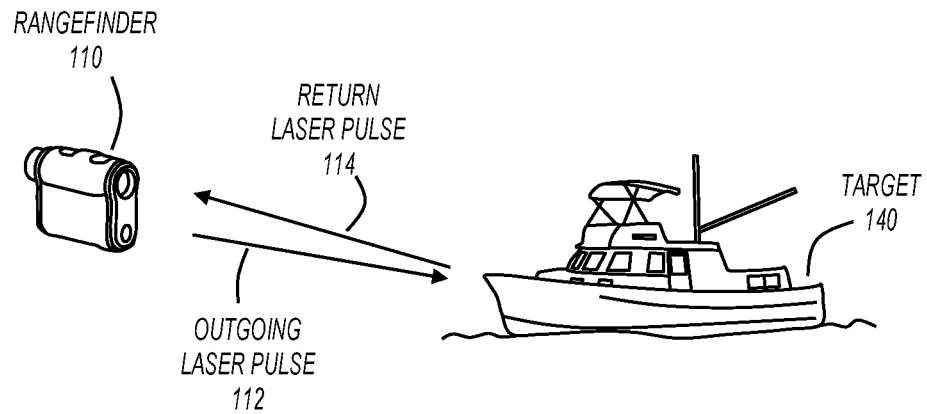
FIGS. 1 and 2 show operation of a prior art rangefinding apparatus.
Figure 2:
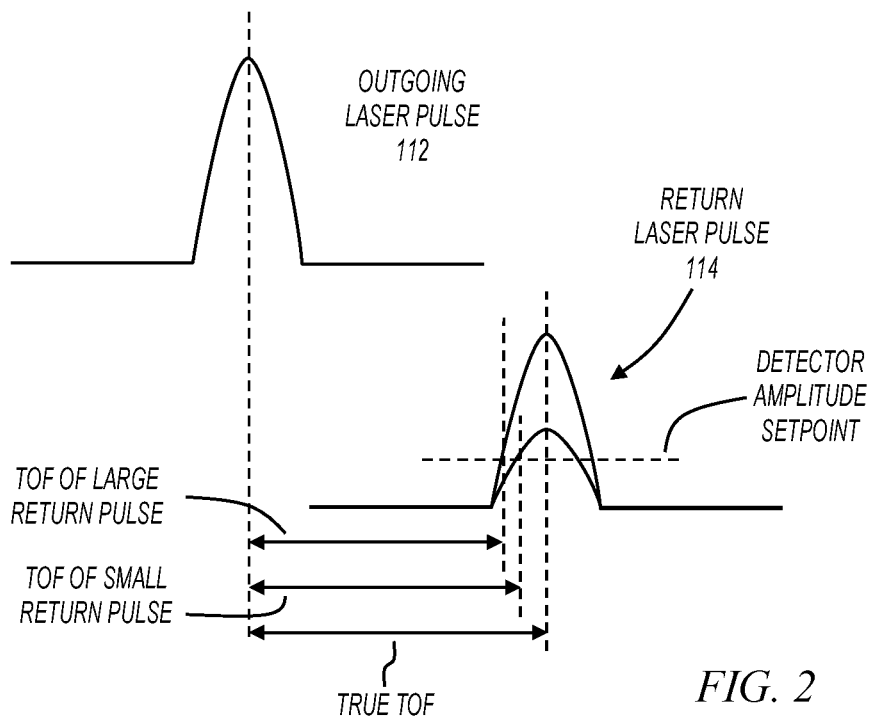

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 3:
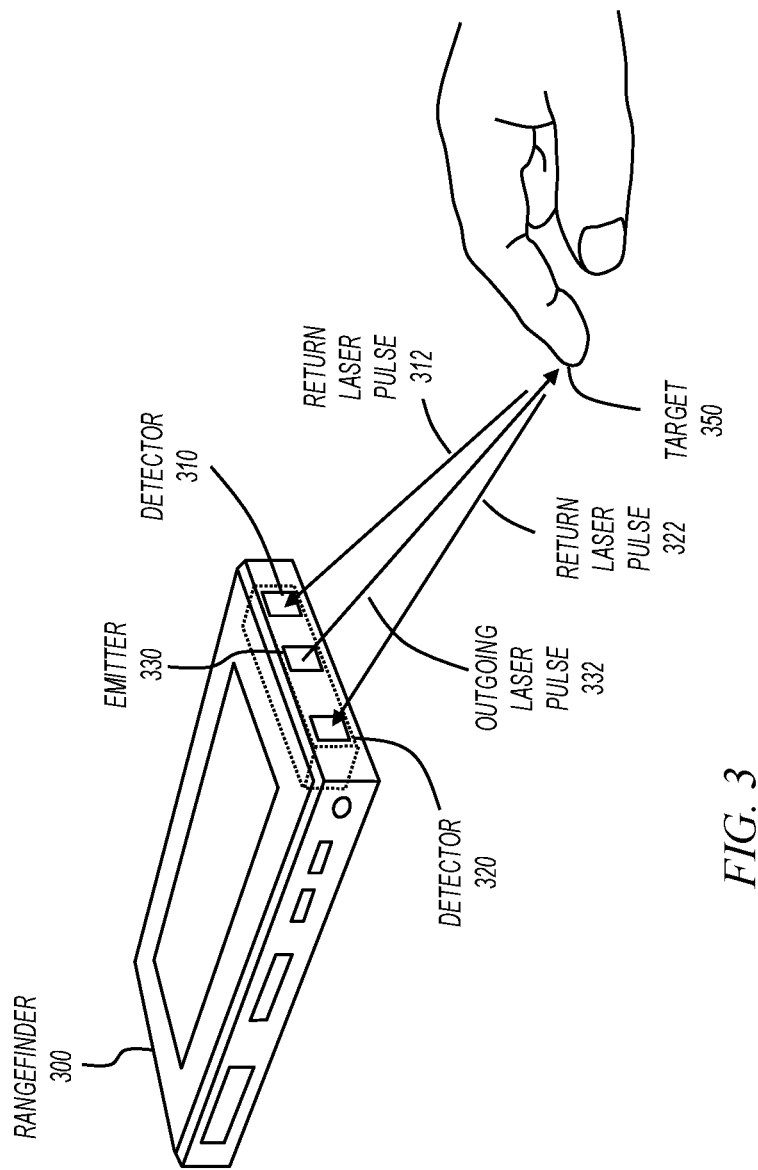
FIG. 3 shows a rangefinding apparatus with dual detectors.

FIG. 3 shows a rangefinding apparatus with dual detectors. Rangefinder 300 includes emitter 330 and detectors 310 and 320. In operation, emitter 330 emits an outgoing laser pulse 332 that is reflected off target 350. Detectors 310 and 320 receive return laser pulses 312 and 322, respectively. In operation, rangefinder 300 may emit outgoing laser pulses periodically with a fixed period or with a non-fixed period. In some embodiments, rangefinder 300 includes one or more scanning mirrors that scan in two dimensions, and the direction of the outgoing laser pulses varies as the mirror scans. Scanning beam display device embodiments are described further below.

Various embodiments of the present invention receive return laser pulses at two or more detectors and perform a proportional correction method to reduce errors introduced by using a fixed amplitude setpoint. The proportional correction method determines a proportional correction factor that is a function of the emitter/detector geometry of rangefinder 300, and the proportional correction factor is applied to the measured times-of-flight to create a more accurate estimate of the correct times-of-flight. These and other embodiments are more fully described below.

Figure 4:
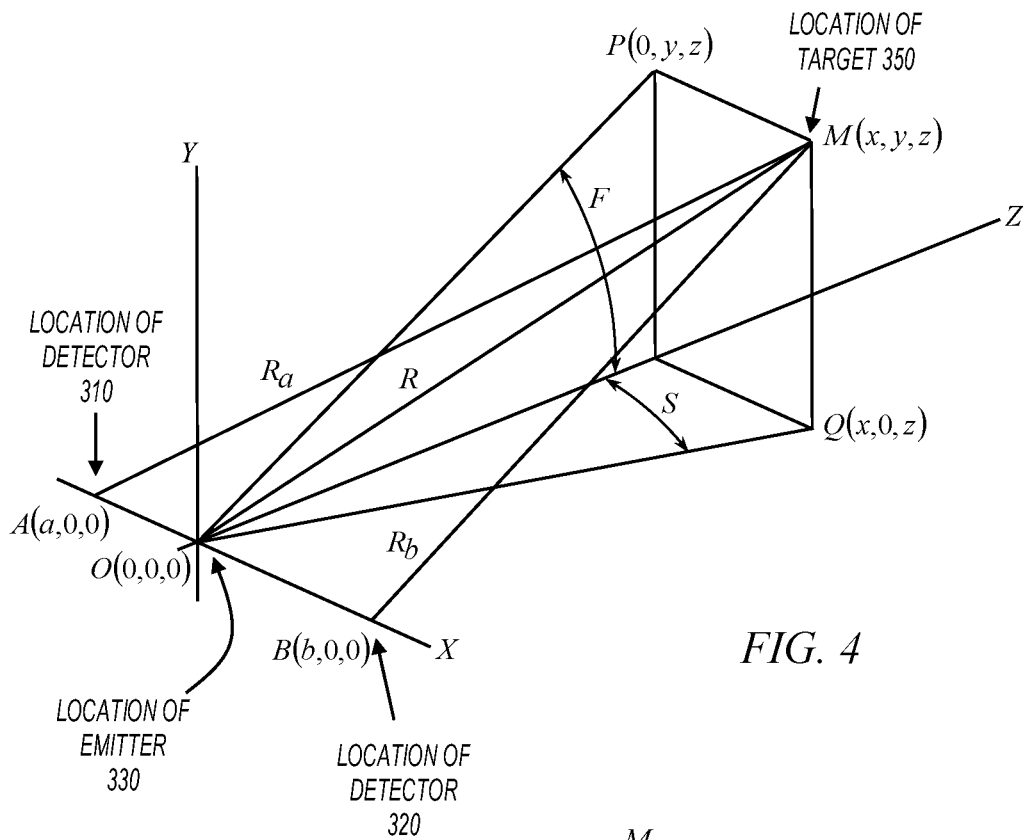
FIG. 4 shows three dimensional operational geometry of a rangefinding apparatus with dual detectors.

FIG. 4 shows three dimensional operational geometry of a rangefinding apparatus with dual detectors. As shown in FIG. 4, point O is the location of emitter 330, which is placed at the origin (0,0,0) in three dimensional space. Point A is the location of detector 310, and point B is the location of detector 320. Point A (location of detector 310) is distance a from the origin (location of emitter 330), and point B (location of detector 320) is distance b from the origin (location of emitter 330). This corresponds to the locations of the emitter and detectors of rangefinder 300 in FIG. 3.

In embodiments represented by FIG. 4, points A, O, and B are collinear. As used herein, the term "collinear" refers to two or more points lying exactly on the same line, nearly exactly on the same line, or close enough to being on the same line that a mathematical assumption of perfect collinearity is valid. For example, design and/or manufacturing considerations may dictate that perfect collinearity between emitter and detectors is not possible, but the resulting positions are close enough to perfect collinearity that the approximation of perfect collinearity for mathematical purposes is valid. In these embodiments, the emitter and detectors are referred to as being collinear.

The location of target 350 is represented by point M, which is located at point (x,y,z) in three dimensional space. Line OP is the projection of OM on Y-Z plane, and line OQ is the projection of OM on X-Z plane. The length of line AM is represented as $R_a$, the length of line BM is represented as $R_b$, and the length of line OM is represented as R. Angle S is the angular offset of the target in the X-Z plane, and angle F is the angular offset of the target in the Y-Z plane.

In some embodiments, angles F and S may be fixed. For example, in a handheld "point and shoot" rangefinder, angles F and S may be fixed, and a user may point the rangefinder towards the target. In other embodiments, one or both of angles F and S may vary over time. For example, in some embodiments, angle F may be fixed and angle S may change over time to create a one dimensional sweep pattern of outgoing laser pulses. Also for example, in some embodiments, both angles F and S may change over time to create a two dimensional sweep pattern of outgoing laser pulses.

As shown in FIG. 4, $R+R_a$ is the distance traveled by a laser pulse from emitter 330 to target 350 to detector 310, and $R+R_b$ is the distance traveled by a laser pulse from emitter 330 to target 350 to detector 320. Laser pulse round trip times-of-flight measured at detectors 310 and 320 may include measurement errors as described above. The measurement errors may be introduced from any source, including from reflectance variations of target 350. Various embodiments of the present invention take advantage of the geometry shown in FIG. 4 to create a proportional correction factor that is applied to the measured times-of-flight to create more accurate estimations of the correct times-of-flight. These estimations are then used to determine the distance (and location) of target 350.

Figure 5:
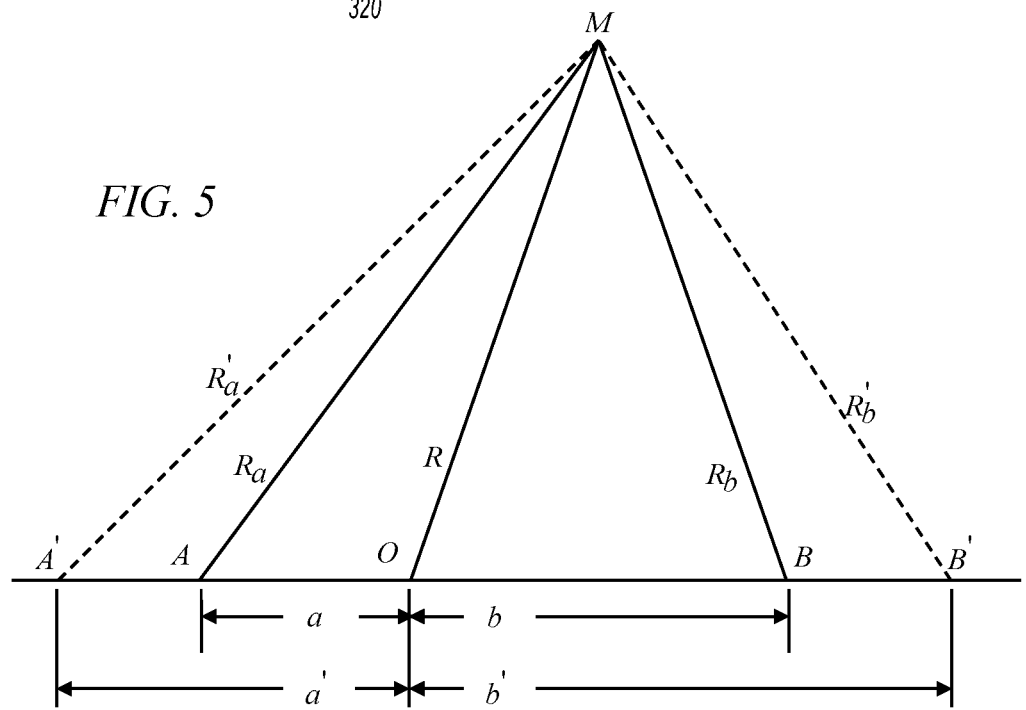
FIG. 5 shows the geometry of FIG. 4 projected in the AMB plane.

FIG. 5 shows the geometry of FIG. 4 in the AMB plane. As shown in FIG. 5, triangles ΔOMA and ΔOMB represent the round trip time-of-flight (TOF) geometry for detectors 310 and 320, respectively. Outgoing laser pulses are emitted at O, and the return laser pulses are received by photodetectors located at A and B. If the following statements are true, the geometry of triangles ΔOMA and ΔOMB are unique:

1. The orientation (angles S and F) of the laser beam at OM is known;
2. The distances a and b are known; and
3. The optical reflection paths MA and MB are from the same reflection target M.

Assuming there are measurement errors caused by the nature of the target, such as amplitude modulation due to reflectance variation of the target's surface, the detectors physically located at A and B measure times-of-flight that would only be correct if the detector positions were shifted to A' and B'. Assuming the two detection channels within the rangefinding apparatus are electronically identical and exhibit ideal linearity, the shifted distances a' and b' are proportional to the measured times-of-flight $R+R_a'$ and $R+R_b'$ respectively.

Various embodiments of the present invention utilize the unique geometry shown in FIGS. 4 and 5 to determine accurate estimates of the correct times-of-flight corresponding to distances $R+R_a$ and $R+R_b$. For example, the measured times-of-flight that correspond to distances $R+R_a'$ and $R+R_b'$ may be proportionally modified until a'=a and b'=b, at which point the modified $R+R_a'$ and $R+R_b'$ reflect accurate estimates of $R+R_a$ and $R+R_b$.

In operation, round trip times-of-flight are measured, and distances a' and b' are solved for. The ratio of a to a' or b to b' is then used as a proportional correction factor m that is applied to the measured times-of-flight to create a more accurate estimate of the correct times-of-flight. This is described mathematically below with reference to FIGS. 4 and 5.

Distance R is given by $$R^2 = x^2 + y^2 + z^2, \quad (1)$$

distance $R_a'$ is given by $$R_a^2 = (x-a)^2 + y^2 + z^2 = R^2 - 2ax + a^2, \quad (2)$$

and distance $R_b'$ is given by $$R_b^2 = (x-b)^2 + y^2 + z^2 = R^2 - 2bx + b^2. \quad (3)$$

Distance $D_a$ is given by $$D_a = R_a + R, \quad (4)$$

and distance $D_b$ is given by $$D_b = R_b + R \quad (5)$$

The tangent of the two known angles F and S are given by $$\tan F = \frac{y}{z} \text{ and} \quad (6)$$

$$\tan S = \frac{x}{z}. \quad (7)$$

The sum of squares of the tangents is given by $$(\tan F)^2 + (\tan S)^2 = \frac{x^2 + y^2}{z^2} = \frac{R^2}{z^2} - 1 \quad (8)$$

and solving for x, y, and z yields $$z = \frac{R}{\sqrt{(\tan F)^2 + (\tan S)^2 + 1}}, \quad (9)$$

$$x = \frac{R \times \tan S}{\sqrt{(\tan F)^2 + (\tan S)^2 + 1}}, \quad (10)$$

and $$y = \frac{R \times \tan F}{\sqrt{(\tan F)^2 + (\tan S)^2 + 1}}. \quad (11)$$

Inserting (10) into (3) yields $$R_b = \sqrt{R^2 - 2bx + b^2} = \sqrt{R^2 - \frac{2 \times b \times R \times \tan S}{\sqrt{(\tan F)^2 + (\tan S)^2 + 1}} + b^2} \quad (12)$$

and inserting (10) into (2) yields $$R_a = \sqrt{R^2 - 2ax + a^2} = \sqrt{R^2 - \frac{2 \times a \times R \times \tan S}{\sqrt{(\tan F)^2 + (\tan S)^2 + 1}} + a^2}. \quad (13)$$

or $$R_a = \sqrt{R^2 - 2aC_s R + a^2} \quad (14)$$

and $$R_b = \sqrt{R^2 - 2bC_s R + b^2} \quad (15)$$

where $$C_s = \frac{\tan S}{\sqrt{(\tan F)^2 + (\tan S)^2 + 1}}. \quad (16)$$

Subtracting (1) from (2) yields $$x = \frac{R^2 - R_a^2 + a^2}{2a} \quad (17)$$

and subtracting (1) from (3) yields $$x = \frac{R^2 - R_b^2 + b^2}{2b} \quad (18)$$

Equating (17) and (18) gives $$aR^2 - aR_b^2 + ab^2 = bR^2 - bR_a^2 + ba^2 \quad (19)$$

Inserting (4) and (5) into (19) and solving for R gives $$R = \frac{ba^2 - ab^2 + aD_b^2 - bD_a^2}{2(aD_b - bD_a)} \quad (20)$$

Inserting (14) and (20) into (4) gives $$D_a = \qquad (21)$$
$$\sqrt{\frac{ba^2 - ab^2 + aD_b^2 - bD_a^2}{2(aD_b - bD_a)} - 2aC_s \left[\frac{ba^2 - ab^2 + aD_b^2 - bD_a^2}{2(aD_b - bD_a)}\right] + a^2} +$$
$$\frac{ba^2 - ab^2 + aD_b^2 - bD_a^2}{2(aD_b - bD_a)}$$

and inserting (15) and (20) into (5) gives $$D_b = \qquad (22)$$
$$\sqrt{\frac{ba^2 - ab^2 + aD_b^2 - bD_a^2}{2(aD_b - bD_a)} - 2bC_s \left[\frac{ba^2 - ab^2 + aD_b^2 - bD_a^2}{2(aD_b - bD_a)}\right] + b^2} +$$
$$\frac{ba^2 - ab^2 + aD_b^2 - bD_a^2}{2(aD_b - bD_a)}.$$

Because $D_a$, $D_b$, and $C_s$ are known, variables a and b can be resolved from equations (21) and (22). When $D_a$ and $D_b$ correspond to measured times-of-flight, then a and b in equations (21) and (22) correspond to a' and b'. Some embodiments solve equations (21) and (22) using numerical methods, and other embodiments include look-up tables that hold precomputed solutions. These and other embodiments are described more fully below. The ability of some embodiments to solve equations (21) and (22) notwithstanding, these equations remain quite complex. Additional embodiments (e.g., embodiments described with reference to FIGS. 6 and 7) show rangefinding apparatus embodiments that provide for simpler solutions for finding a' and/or b'.

At this point in the process, all of the geometry has been solved and proportional correction is applied to estimate accurate times-of-flight and therefore distance to the target. To apply proportional correction, a is solved for as described above and then using the known value of a, the proportional correction factor m is found as $$m = \frac{a}{a'}. \quad (23)$$

The improved accuracy time-of-flight estimates are then determined as $$D_a = mD_a' \quad (24)$$

and $$D_b = mD_b'. \quad (25)$$

where the measured round trip times-of-flight are represented by $D_a'$ and $D_b'$, and the improved accuracy round trip time-of-flight estimates are represented by $D_a$ and $D_b$. The location of the target and the range to the target is then determined using the trigonometric relationships described above.

As described above, the solutions for a and b in equations (21) and (22) are quite complex. Further embodiments with different geometries that simplify the solutions for a and b are now described.

Figure 6:
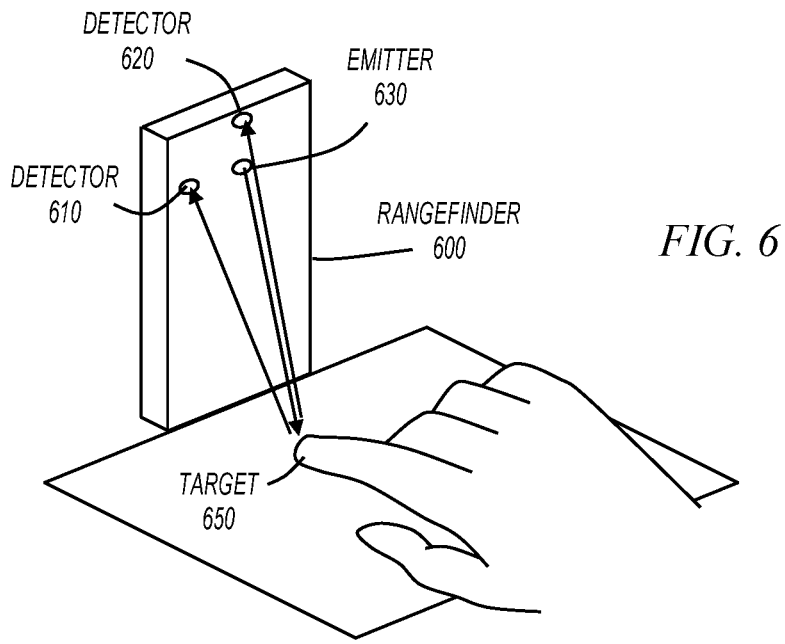
FIG. 6 shows a rangefinding apparatus with dual detectors.

FIG. 6 shows a rangefinding apparatus with dual detectors. Rangefinder 600 includes emitter 630 and detectors 610 and 620. In operation, emitter 630 emits an outgoing laser pulse that is reflected off target 650. Detectors 610 and 620 receive return laser pulses. Rangefinder 600 is similar to rangefinder 300 (FIG. 3) with the exception that detectors 610 and 620 are not collinear with emitter 630. Although rangefinder 600 shows a 90 degree relationship between the two detectors and the emitter, this is not a limitation of the present invention. For example, some non-collinear embodiments have other than a 90 degree relationship. As shown below, placing the detectors in a non-collinear relationship with emitter 630 simplifies the mathematics for proportional correction.

Figure 7:
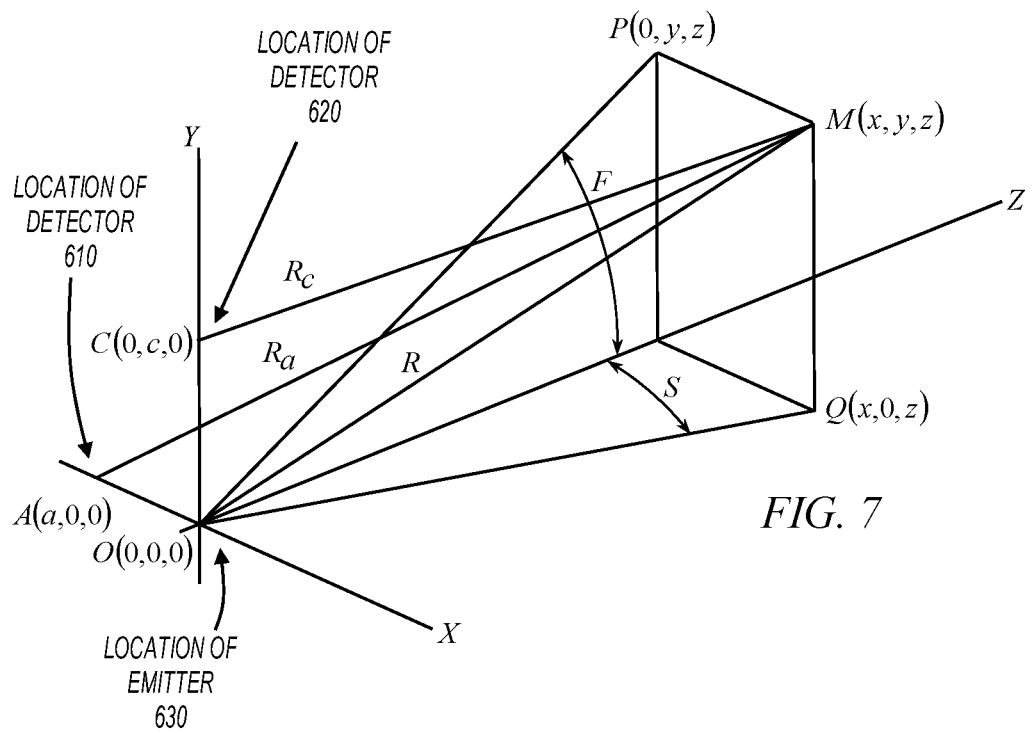
FIG. 7 shows three dimensional operational geometry of a rangefinding apparatus with dual detectors.

FIG. 7 shows three dimensional operational geometry of a rangefinding apparatus with dual detectors. As shown in FIG. 7, point O is the location of emitter 630, which is placed at the origin (0,0,0) in three dimensional space. Point A is the location of detector 610, and point C is the location of detector 620. Point A is distance a from the origin, and point C is distance c from the origin. In embodiments represented by FIG. 7, points A, O, and C are not collinear. This corresponds to the locations of the emitter and detectors of rangefinder 600 in FIG. 6.

The location of target 650 is represented by point M, which is located at point (x,y,z) in three dimensional space. Line OP is the projection of OM on Y-Z plane, and line OQ is the projection of OM on X-Z plane. The length of line AM is represented as $R_a$, the length of line CM is represented as $R_c$, and the length of line OM is represented as R. Angle S is the angular offset of the target in the X-Z plane, and angle F is the angular offset of the target in the Y-Z plane.

The round trip times-of-flight for the two detectors in FIG. 7 are given by $$D_a = R + R_a \quad (26)$$

and $$D_c = R + R_c \quad (27)$$

And the two equations used to solve for a and b become $$D_a^2 - 2D_a R_a - 2aC_s D_a + 2aC_s R_a + a^2 = 0 \quad (28)$$

and $$D_c^2 - 2D_c R_c - 2cC_F D_c + 2cC_F R_c + c^2 = 0 \quad (29)$$

where $$C_F = \frac{\tan F}{\sqrt{(\tan F)^2 + (\tan S)^2 + 1}}. \quad (30)$$

As a result of the non-collinear relationship of the emitter and detectors, the large cross terms present in equations (21) and (22) are absent from equations (28) and (29), thereby greatly simplifying the solution. Although solutions to equations (28) and (29) are simpler than solutions for equations (21) and (22), because $D_a$, $R_a$ and $D_c$, $R_c$ are not independent from each other in each equation, equations (28) and (29) still defy easy solution.

In some embodiments, the solution is further simplified by making b=0 in equations (21) and (22) (or b=0 in equations (28) and (29). In these embodiments, $$b = 0 \quad (31)$$

$$D_b = 2R \quad (32)$$

and $$a^2 - aC_s D_b - D_a^2 + D_a D_b = 0. \quad (33)$$

The solution for a then becomes $$a = \frac{1}{2}(-p \pm \sqrt{p^2 - 4q}) \quad (34)$$

where $$p = \frac{\tan S}{\sqrt{(\tan F)^2 + (\tan S)^2 + 1}} D_b \quad (35)$$

and $$q = D_a D_b - D_a^2. \quad (36)$$

As described above, once a is found, the proportional correction factor m can be found using equation (23) and improved estimates of the times-of-flight can be created using equations (24) and (25).

When b is assumed to be zero, this means that one detector is collocated with the emitter. In some embodiments, one detector is placed as close as possible to the emitter and b is simply approximated to be zero. In practice, this is a valid approximation when target distances are much greater than b. Accordingly, the term "collocated" as used herein refers to the emitter and detector being placed close enough such that an approximation of b=0 is valid.

In some embodiments, both a and b are nonzero, and the proportional correction is first performed with an approximation that b is zero, and the proportional correction is performed again with an approximation that a is zero. For example, assuming a=0 ($D_a=2R$) and b≠0

$$b^2 - 2bC_s R - D_b^2 + 2RD_b = 0 \quad (37)$$

Reducing R from equations (33) and (37) yields $$(a^2 - D_a^2)(bC_s - D_b) = (b^2 - D_b^2)(aC_s - D_a) \quad (38)$$

Equation (38) can be rearranged as $$(bC_s - D_b)a^2 - C_s(b^2 - D_a^2)a - [D_a^2(bC_s - D_b) - D_a(b^2 - D_b^2)] = 0 \quad (39)$$

With the two measured times-of-flight $D_a$ and $D_b$ and constant $C_s$ and known distance b, equation (39) is simply solved for variable a. In these embodiments, the second detector can be placed anywhere instead of being collocated with the emitter.

FIG. 3 shows an emitter placed in between two detectors, and FIG. 6 shows an emitter with two detectors at 90 degrees. The various embodiments of the present invention are not limited to these configurations. For example, in some embodiments, the emitter and detectors are collinear, but the detectors are all on one side of the detector. Also for example, in some embodiments, the emitter and detectors are non-collinear, and the detectors are closer to each other than to the emitter.

Some embodiments include more than two detectors. For example, some embodiments include three, four, or more detectors to increase the confidence of the resulting distance measurement. In some embodiments, the math described above is extended to perform proportional correction to more than two detectors. In other embodiments, more than two detectors are used to detect reflections, and two of the detectors are chosen to be used for proportional correction. For example, in some embodiments, multiple detectors may be included in rangefinding apparatus where each of the detectors has a finite field of view (FOV). The FOV of the detectors may overlap, or may be non-overlapping. In these embodiments, two of the detectors may be chosen for the proportional correction analysis based on signal strength, geometrical relationship to the target, or any other criteria.

Figure 8:
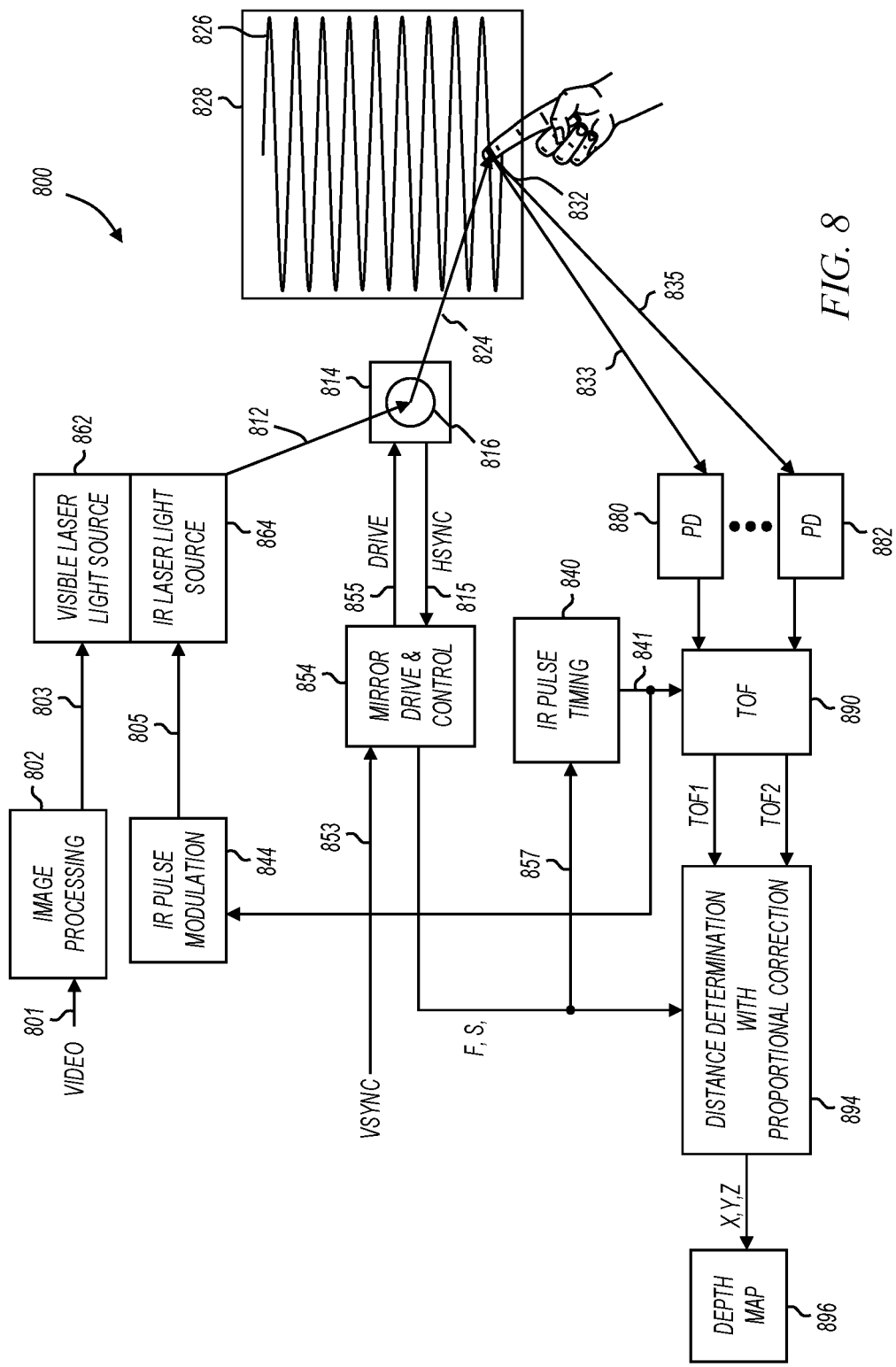
FIG. 8 shows a scanned beam display system with at least two detectors in accordance with various embodiments of the present invention.

FIG. 8 shows a scanned beam display system with at least two detectors in accordance with various embodiments of the present invention. System 800 includes image processing component 802, light sources 862 and 864, scanning platform 814 with scanning mirror 816, and mirror drive and control circuit 854. System 800 also includes photodetectors (PD) 880 and 882, time-of-flight (TOF) measurement circuit 890, distance determination circuit 894, infrared (IR) pulse timing circuit 840, and IR pulse modulation circuit 844.

Light sources 862 and 864 may be laser light sources such as laser diodes or the like, capable of emitting a modulated laser beam 812. The beam 812 impinges on a scanning platform 814 which is part of a microelectromechanical system (MEMS) based scanner or the like, and reflects off of scanning mirror 816 to generate a controlled output beam 824. A scanning mirror drive and control circuit 854 provides one or more drive signal(s) 855 to control the angular motion of scanning mirror 816 to cause output beam 824 to generate a raster scan 826 on a projection surface 828. In operation, light sources 862 and/or 864 produce light pulses and scanning mirror 816 reflects the light pulses as beam 824 traverses raster scan 826.

In some embodiments, raster scan 826 is formed by combining a sinusoidal component on the horizontal axis and a sawtooth component on the vertical axis. In these embodiments, controlled output beam 824 sweeps back and forth left-to-right in a sinusoidal pattern, and sweeps vertically (top-to-bottom) in a sawtooth pattern with the display blanked during flyback (bottom-to-top). FIG. 8 shows the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal. The various embodiments of the present invention are not limited by the waveforms used to control the vertical and horizontal sweep or the resulting raster pattern. The vertical axis is also referred to as the slow scan axis, and the horizontal axis is also referred to as the fast-scan axis. The labels "vertical" and "horizontal" are somewhat arbitrary, since a 90 degree rotation of the apparatus will switch the horizontal and vertical axes. Accordingly, the terms "vertical" and "horizontal" are not meant to be limiting.

Although scanning mirror 816 is shown as a single mirror that scans in two dimensions, this is not a limitation of the present invention. For example, in some embodiments, mirror 816 is replaced by two mirrors, one scanning in one dimension, and a second scanning in a second dimension.

In some embodiments, scanning platform 814 includes one or more position sensors to sense the position of mirror 816. For example, in some embodiments, scanning platform 814 includes a piezoresistive sensor that delivers a voltage that is proportional to the deflection of the mirror on the fast-scan axis. Further, in some embodiments, scanning platform 814 includes an additional piezoresistive sensor that delivers a voltage that is proportional to the deflection of the mirror on the slow-scan axis. For example, the horizontal sync (HSYNC) sync signal shown in FIG. 8 may be produced directly by a position sensor or may be produced from a sinusoidal position signal.

In operation, mirror drive and control circuit 854 provides drive signal(s) 855 to control the angular motion of scanning mirror 816. In some embodiments, scanning mirror 816 includes one or more sensors to detect the angular position or angular extents of the mirror deflection (in one or both dimensions), and this information is provided back to mirror drive and control circuit 854 as one or more sync signals 815. In these embodiments, mirror drive and control circuit 854 includes one or more feedback loops to modify the drive signals in response to the measured angular deflection of the mirror. In addition, in some embodiments, mirror drive and control circuit 854 receives a vertical sync signal from the video data source at 853. Mirror drive and control circuit 854 also produces two signals that represent instantaneous angles F and S on node 857.

Mirror drive and control circuit 854 is implemented using functional circuits such as phase lock loops (PLLs), filters, adders, multipliers, registers, processors, memory, and the like. Accordingly, mirror drive and control circuit 854 may be implemented in hardware, software, or in any combination. For example, in some embodiments, control circuit 854 is implemented in an application specific integrated circuit (ASIC). Further, in some embodiments, some of the faster data path control is performed in an ASIC and overall control is software programmable. An example implementation of mirror and drive control circuit 854 is described below with reference to FIG. 9.

Image processing component 802 receives video data on node 801 and produces pixel data on node 803 used to drive light source(s) 862 when pixels are to be displayed. The video data on node 801 represents image source data that is typically received with pixel data on a rectilinear grid, but this is not essential. For example, video data on node 801 may represent a grid of pixels at any resolution (e.g., 640×480, 848×480, 1920×1080). Raster scan 826 does not necessarily align with the rectilinear grid in the image source data, and image processing component 802 operates to produce display pixel data that will be displayed at appropriate points on the raster pattern. For example, in some embodiments, image processing component 802 interpolates vertically and/or horizontally between pixels in the source image data to determine display pixel values along the scan trajectory of the raster pattern.

In some embodiments, light source 862 sources visible light. For example, light source 862 may include sources of red, green, and blue laser light. In these embodiments, visible light sources 862 are modulated to produce color pixels that are used to create an image as output beam 824 traverses raster scan 826.

In some embodiments, light source 864 sources nonvisible light such as infrared (IR) light. In these embodiments, PD 880 and PD 882 are able to detect the same wavelength of nonvisible light. For example, in some embodiments, light source 864 may be an infrared laser diode that produces light with a wavelength of substantially 808 nanometers (nm). The wavelength of light is not a limitation of the present invention. Any wavelength, visible or nonvisible, may be used without departing from the scope of the present invention.

System 800 includes rangefinding with proportional correction as described above. Scanning mirror 816 corresponds to emitter 330 (FIG. 3) or emitter 630 (FIG. 6), and photodetectors 880 and 882 correspond to detectors 310, 320 (FIG. 3) or detectors 610, 620 (FIG. 6). In collinear embodiments, scanning mirror 816 and detectors 880, 882 are placed such that they lie substantially in a line, and in non-collinear embodiments, scanning mirror 816 and detectors 880, 882 are positioned so that they do not lie in a line. In some embodiments, one of detectors 880 and 882 is collocated with scanning mirror 816. Collocated embodiments are further described above with reference to FIGS. 6 and 7.

Some embodiments of apparatus 800 include more than two photodetectors. For example, in some embodiments, more than two photodetectors receive laser pulse reflections, and photodetectors 880 and 882 represent two photodetectors that are selected to provide signals used for proportional correction as described above. Photodetectors may be selected using any criteria, including received signal strength, geometric relationship to the emitter, geometric relationship to the target, or the like.

The rate at which IR pulses are created, reflected, and processed in the receive signal paths may determine the horizontal spatial measurement resolution on raster pattern 826. For example, if pulses are created far apart in time, then measured points on raster pattern 826 may be further apart, and the horizontal spatial resolution will decrease. Also for example, if pulses are created closer in time, then the horizontal spatial resolution can increase.

Time-of-flight (TOF) measurement circuit 890 receives IR pulse timing information from IR pulse timing circuit 840 and compares it to the timing of received IR pulses to measure round trip times-of-flight of an IR pulse, thereby measuring the distance to either the projection surface or the pointing object 832. Accordingly, the target can be the pointing object 832, or any point on projection surface 828. TOF measurement circuit 890 produces two measured times-of-flight TOF1 and TOF2, which correspond to $D_a'$ and $D_b'$ or $D_a'$ and $D_c'$.

TOF measurement circuit 890 may be implemented with any suitable circuit elements. For example, in some embodiments, TOF measurements circuit 890 includes digital and/or analog timers, integrators, correlators, registers, adders, or the like to compare the timing of the reflected IR pulses with the IR pulse timing information from IR pulse timing circuit 840. An example TOF measurement circuit is described below with reference to FIG. 10.

Position determination circuit 894 receives the measured times-of-flight TOF1 and TOF2, and also receives the angular information F and S from mirror drive and control circuit 854. In operation, position determination circuit 894 applies proportional correction to TOF1 and TOF2 to create more accurate estimates of the times-of-flight to the target as described above. In some embodiments, distance determination circuit 894 also generates the three dimensional position (x,y,z) of the target.

Position detection circuit 894 may be implemented with any suitable circuit elements. For example, in some embodiments, position detection circuit 894 is implemented using functional circuits such as adders, multipliers, registers, processors, memory, look-up tables, and the like. Accordingly, position detection circuit 894 may be implemented in hardware, software, or in any combination. For example, in some embodiments, position detection circuit 894 is implemented in an application specific integrated circuit (ASIC). Further, in some embodiments, some of the faster data path control is performed in an ASIC and overall control is software programmable. Example implementations of position detection circuit 894 are described below with reference to FIGS. 11 and 12.

Depth map storage 896 receives three dimensional (3D) data from position detection circuit 894 for various points in the field of view and stores this data as a depth map. Depth map data may then be used for any suitable purpose. Examples include 3D imaging, gesture recognition, and the like.

Depth map storage 896 may be implemented using any suitable circuit structure. For example, in some embodiments, depth map storage 896 is implemented in a dual port memory device that can be written on one port and read on a second port. In other embodiments, depth map storage is implemented as data structures in a general purpose memory device. In still further embodiments, depth map storage 896 is implemented in an application specific integrated circuit (ASIC).

IR pulse timing circuit 840 controls the generation of IR pulses and causes them to be generated at times that spatially place the pulses in a desired pattern within the field of view. For example, IR pulse timing circuit 840 may control the timing of IR pulses based on angular information F and S provided on node 857 by mirror and drive control circuit 854. Timing signals for each IR pulse are then provided to TOF measurement circuit 890 and IR pulse modulation circuit 844. IR pulse timing circuit 840 may be implemented using any suitable circuit elements. For example, IR pulse timing circuit 840 may be implemented using a processor and memory, a dedicated state machine, registers, adders, multipliers, and the like.

IR pulse modulation circuit 844 modulates pulses that are used to drive IR laser light source 864. For example, IR pulse modulation circuit 844 may control the power level, pulse shape, or any other characteristic of the pulses used to drive IR laser light source 864. IR pulse modulation circuit 844 modulates pulses in response to the timing signals received from IR timing circuit 840. IR pulse modulation circuit 844 may be implemented with any suitable circuit elements. For example, in some embodiments, IR pulse modulation circuit 844 includes digital-to-analog converters, amplifiers, filters, and the like.

Figure 9:
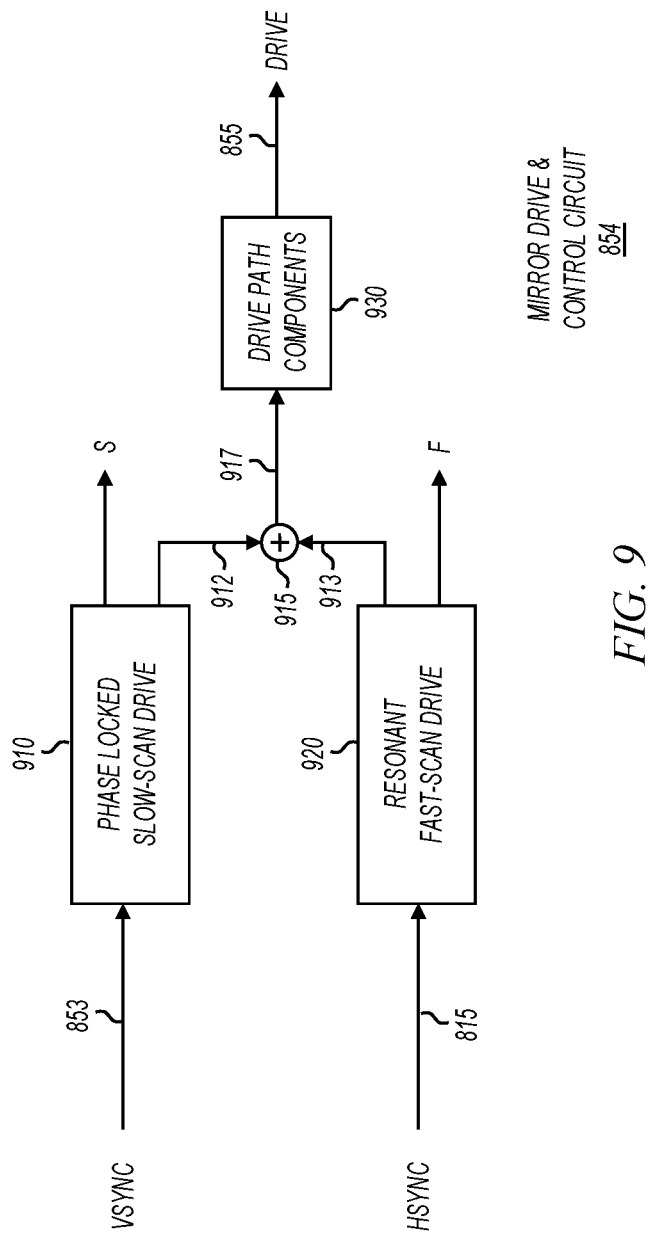
FIG. 9 shows a mirror drive and control circuit in accordance with various embodiments of the present invention.

FIG. 9 shows a mirror drive and control circuit in accordance with various embodiments of the present invention. Mirror drive and control circuit 854 includes phase locked slow scan drive 910, resonant fast-scan drive 920, summer 915, and drive path components 930. In operation, output signals from phase locked slow-scan drive 910 and resonant fast-scan drive 920 are summed by summer 915 to produce a combined drive signal on node 917. The combined drive signal on node 917 is then conditioned by drive path components 930 to produce the MEMS drive signal on node 855.

Phase locked slow-scan drive 910 provides a control signal on node 912 to cause MEMS mirror 816 to sweep on the slow-scan axis. The control signal on node 816 works in combination with the mirror dynamics to result in the desired mirror movement on the slow-scan axis. Phase locked slow-scan drive 910 also provides a signal S that describes the angular mirror position on the slow-scan axis at any point in time. Phase locked slow-scan drive 910 receives the incoming video VSYNC on node 853. In some embodiments, phase locked slow-scan drive 910 phase locks the control signal on node 912 to the incoming VSYNC to lock the slow-scan sweep of MEMS mirror 816 to the incoming video frame rate.

Resonant fast-scan drive 920 provides periodic excitations to cause MEMS mirror 816 to oscillate at the mechanical resonant frequency on the fast-scan axis. Resonant fast scan drive 920 receives the HSYNC signal on node 815 as a feedback signal. Resonant fast scan drive 194 includes a control circuit that may alter the timing or amplitude of its output signal as a function of the HSYNC signal. Resonant fast-scan drive 920 also provides a signal F that describes the angular mirror position on the fast-scan axis at any point in time.

Phase locked slow-scan drive 910 and resonant fast-scan drive 920 may be implemented with any suitable circuits. For example, in some embodiments, phase locked slow-scan drive 910 and resonant fast-scan drive 920 includes phase locked loops, comparators, filters, multipliers, dividers, oscillators, and the like. The manner in which phase locked slow-scan drive 910 and resonant fast-scan drive 920 are implemented is not a limitation of the present invention.

Summer 915 sums the excitation signals on nodes 912 and 913, and the result is provided to drive path components 930, which produces the final analog drive signal on node 855. The final analog drive signal includes the slow-scan drive signal used to cause deflection of the mirror on the slow-scan axis as well as the excitation signal that causes resonant motion of resonant MEMS device 816. Drive path components 930 may include any suitable components, including a digital-to-analog converter (DAC), filters, amplifiers, and the like.

Figure 10:
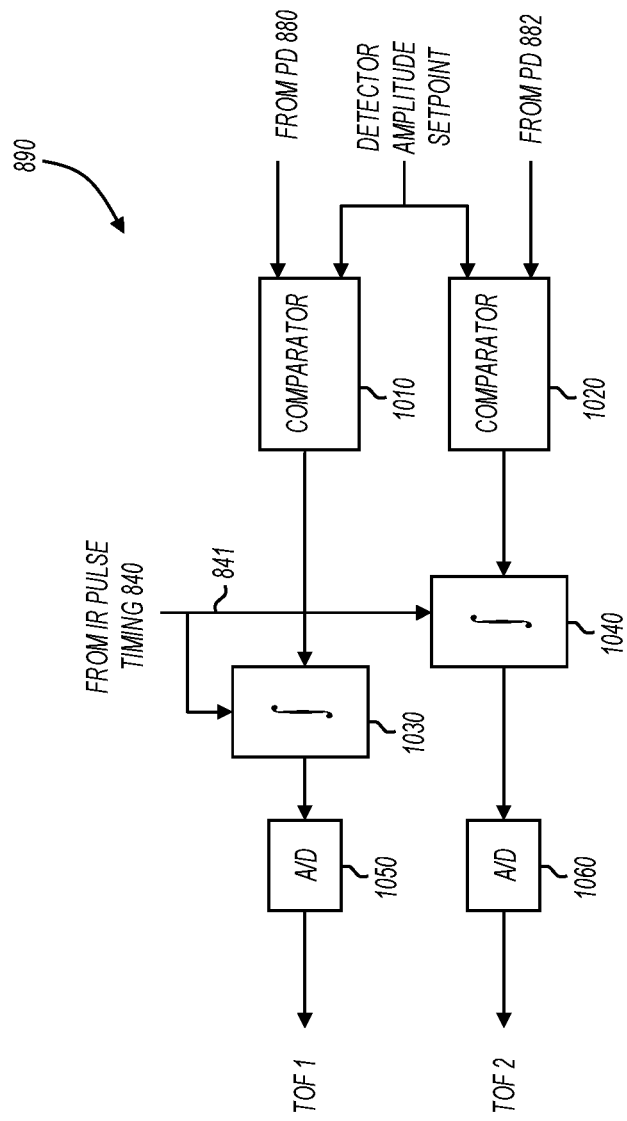
FIG. 10 shows a time of flight (TOF) detection circuit in accordance with various embodiments of the present invention.

FIG. 10 shows a time of flight (TOF) detection circuit in accordance with various embodiments of the present invention. TOF detection circuit 890 includes comparators 1010 and 1020, integrators 1030 and 1040, and analog-to-digital converters (A/D) 1050 and 1060.

In operation, comparator 1010 receives a signal from photodetector 880 and compares it to a fixed amplitude setpoint. Comparator 1020 receives a signal from photodetector 882 and compares it to the same fixed amplitude setpoint. Integrators 1030 and 1040 receive a signal on node 841 from IR pulse timing circuit 840 when an IR pulse is emitted. In response to the signal on node 841, integrators 1030 and 1040 are zeroed and started. When a return pulse received by photodetector 880 has an amplitude greater than the fixed amplitude setpoint, comparator 1010 stops integrator 1030. A/D 1050 digitizes the integrated time value produced by integrator 1030 to produce TOF1. Similarly, when a return pulse received by photodetector 882 has an amplitude greater than the fixed amplitude setpoint, comparator 1020 stops integrator 1040. A/D 1060 digitizes the integrated time value produced by integrator 1040 to produce TOF2. TOF1 and TOF 2 are the measured times-of-flight used in the calculations described above.

In some embodiments, integrators 1030 and 1040 are replaced with digital counters that are started by the signal on node 841 and stopped by comparators 1010 and 1020. There are many possible ways to implement TOF detection circuit 890 without departing from the scope of the present invention.

Figure 11:
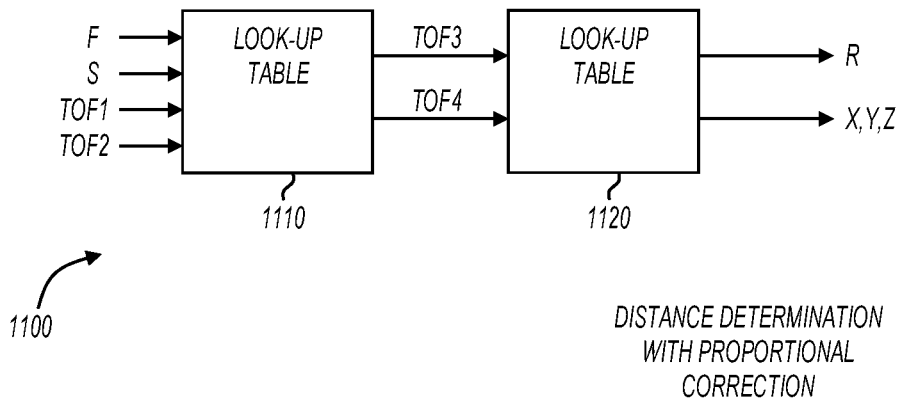
FIGS. 11 and 12 show embodiments of distance determination circuits with proportional correction.
Figure 12:
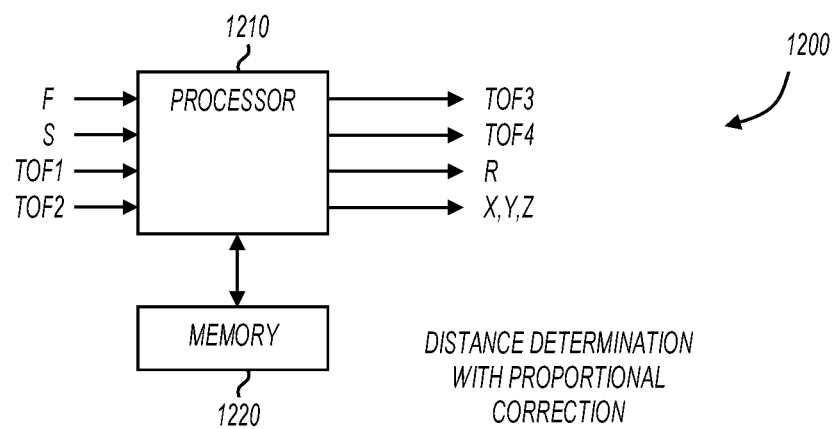

FIGS. 11 and 12 show embodiments of distance determination circuits with proportional correction. FIG. 11 shows distance determination with proportional correction circuit 1100. In some embodiments, circuit 1100 is used to implement circuit 894 (FIG. 8). Circuit 1100 includes two look-up tables. Look up table 1110 receives angle information F and S, and measured round trip times-of-flight TOF1 and TOF2. Look-up table 1110 holds pre-computed solutions for corrected round trip times-of-flight TOF3 and TOF4. TOF3 and TOF4 represent times-of-flight for round trip paths $D_a$ and $D_b$, or $D_a$ and $D_c$. See equations (24) and (25), above.

In some embodiments, look-up table 1110 effectively determines the proportional correction factor m using pre-computed solutions for a' and b', or a' and c' as a function of F, S, TOF1, and TOF2, and applies that proportional correction factor to TOF1 and TOF2 to create TOF3 and TOF4.

Look up table 1110 may be implemented using any suitable circuit elements. For example, in some embodiments, look up table 1110 is a memory device that holds values for TOF3 and TOF4 at addressable locations specified by F, S, TOF1 and TOF2.

Circuit 1100 also includes look-up table 1120. Look-up table 1120 receives the corrected round trip times-of-flight TOF3 and TOF4 and generates the distance R to the target and the three dimensional position (x,y,z) of the target using the trigonometric relationships described above.

FIG. 12 shows a distance determination with proportional correction circuit 1200. In some embodiments, circuit 1200 may be used for circuit 894 (FIG. 8). Circuit 1200 includes processor 1210 and memory 1220. Memory 1220 includes instructions that when executed by processor 1210, cause processor 1210 to perform mathematical operations that determine TOF3, TOF4, R, and (x,y,z) from F, S, TOF1, and TOF2. For example, in some embodiments, circuit 1200 solves equations (21) and (22) for a and/or b, and determines TOF3 and TOF4 using equations (24) and (25). In other embodiments, circuit 1200 solves equations (28) and (29) for a and/or b, and determines TOF3 and TOF4 using equations (24) and (25). Circuit 1200 also determines R and (x,y,z) using the trigonometric relationships described above.

Although FIG. 11 shows only look-up tables and FIG. 12 shows only a processor circuit to determine distances with proportional correction, this is not a limitations of the present invention. For example, in some embodiments, the distance determination with proportional correction circuit includes a processor for overall control and one or more dedicated hardware circuits such as look-up tables for data path speed.

Figure 13:
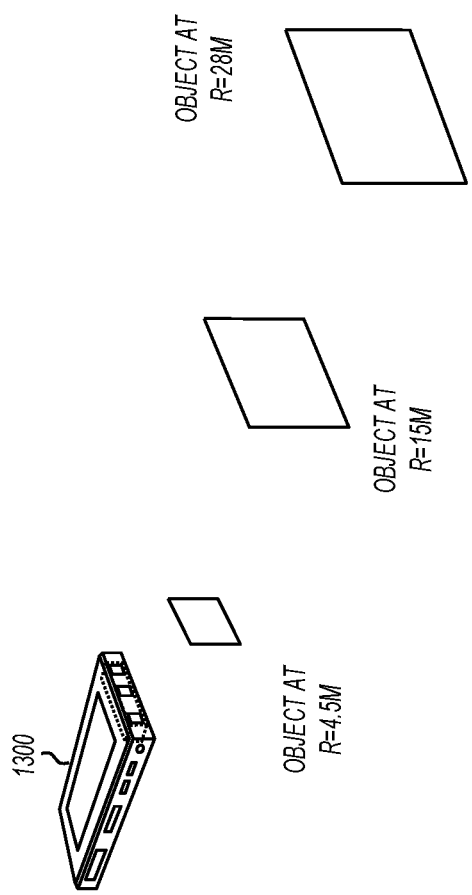
FIG. 13 shows a rangefinder detecting the range of objects at three different distances in accordance with various embodiments of the present invention.
Figure 14:
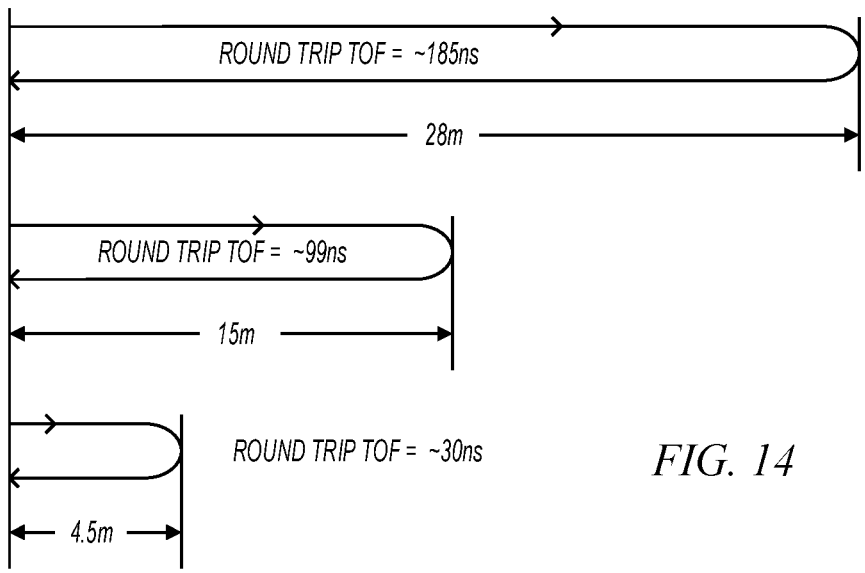
FIG. 14 shows round trip times-of-flight to the objects in FIG. 13.

FIG. 13 shows a rangefinder detecting the range of objects at three different distances in accordance with various embodiments of the present invention. Rangefinding apparatus 1300 launches laser pulses to measure the distance of objects at 4.5 meters, 15 meters, and 28 meters. FIG. 14 shows round trip times-of-flight to the objects in FIG. 13. As shown in FIG. 14, the round trip times-of flight are approximately 30 ns, 99 ns, and 185 ns. For short laser pulse spacing, this can cause return pulses to be received out of order if successive pulses are reflected from the different targets. This example is described further with respect to FIG. 15.

Figure 15:
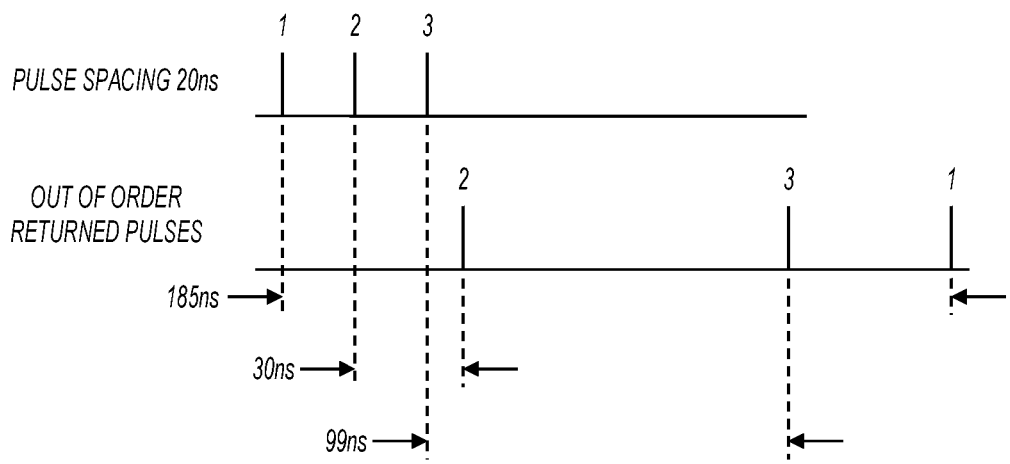
FIG. 15 shows an ambiguous receive order of closely spaced pulses.

FIG. 15 shows an ambiguous receive order of closely spaced pulses. FIG. 15 shows three emitted pulses spaced 20 ns apart. The first pulse is reflected off the target 28 meters away, the second pulse is reflected off the target 4.5 meters away, and the third pulse is reflected off the target 15 meters away. Because of the round trip times-of flight for the three targets, they are received out of order with the second pulse received first, the third pulse received second, and the first pulse received third.

In general, larger distance measurements require larger pulse spacing in order to avoid the out of order reception problem. Various embodiments of the present invention are capable of using short pulse spacing while making large distance measurements. This allows fine spatial granularity of measurement in the field of view, while preserving the ability to measure short distances as well as long distances.

Figure 16:
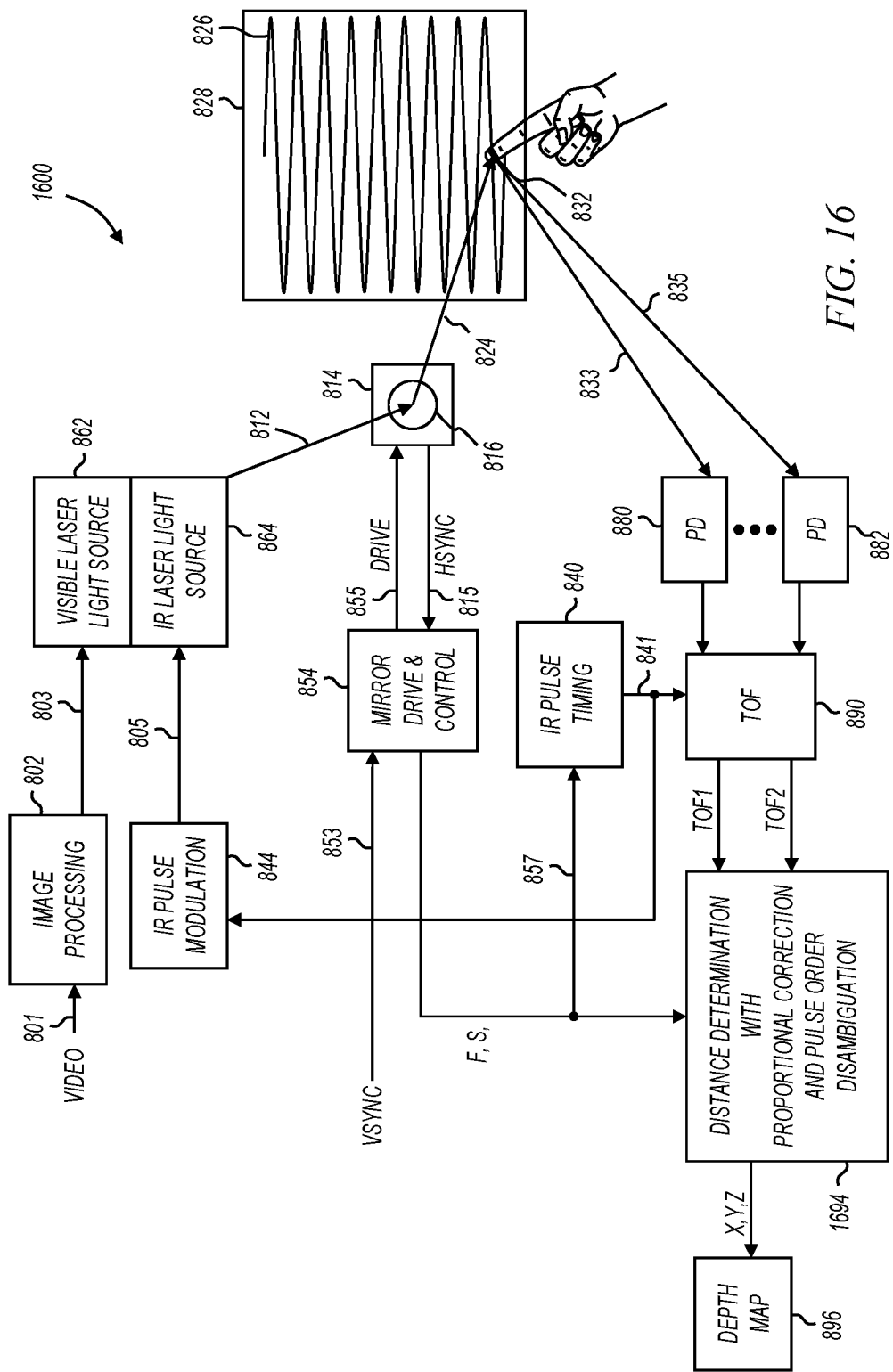
FIG. 16 shows a scanned beam display system with at least detectors and pulse receive order disambiguation in accordance with various embodiments of the present invention.

FIG. 16 shows a scanned beam display system with at least two detectors and pulse receive order disambiguation in accordance with various embodiments of the present invention. Scanned beam display system 1600 is the same as scanned beam display system 800 (FIG. 8) with the exception of distance determination with proportional correction and pulse order disambiguation circuit 1694. In some embodiments, this circuit determines distances and applies proportional correction similar to circuit 894 (FIG. 8), but also performs disambiguation of received pulse order for closely spaced laser light pulses. Examples of circuit 1694 are described more fully below.

Figure 17:
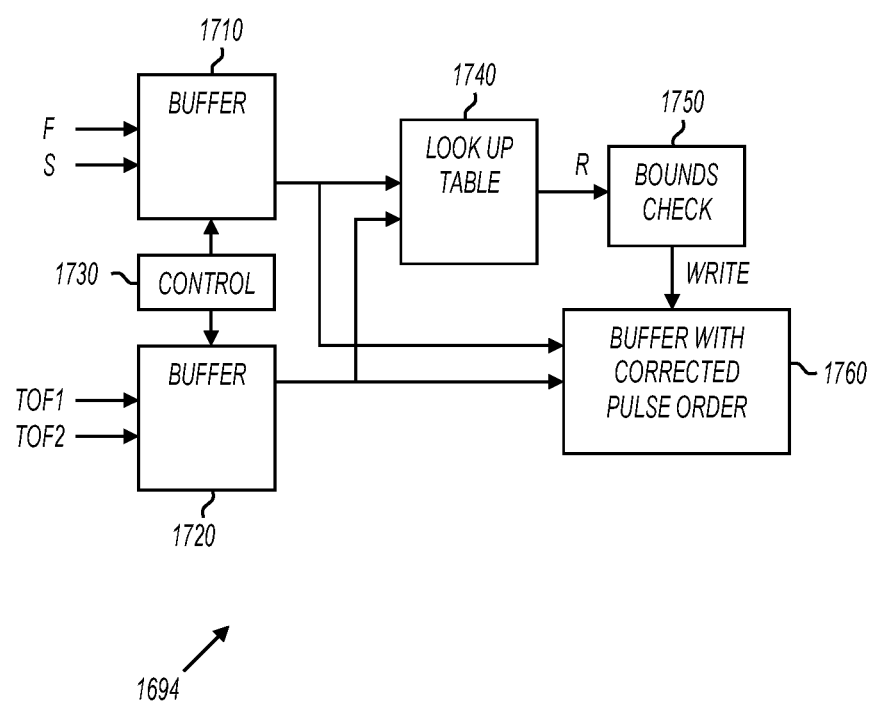
FIG. 17 shows a distance determination circuit with proportional correction and pulse receive order disambiguation in accordance with various embodiments of the present invention.

FIG. 17 shows a distance determination circuit with proportional correction and pulse receive order disambiguation in accordance with various embodiments of the present invention. Circuit 1694 includes buffers 1710, 1720, and 1760, control circuit 1730, look-up table 1740, and bounds checking circuit 1750.

In operation, angles F and S that correspond to launched laser light pulses are saved in buffer 1710, and measured round trip times-of-flight TOF1 and TOF2 are saved in buffer 1720. If pulses are received out of order then the order of the measured times-of-flight may not correspond to order of the stored angles F and S.

After buffers 1710 and 1720 have been written with angle and time-of-flight information, processing is performed to re-sort the times-of-flight. During this processing, control circuit 1730 addresses buffers 1710 and 1720 to provide all possible combinations of angle and time-of-flight to look-up table 1740. Look-up table 1740 performs proportional correction as described above. Bounds checking circuit 1750 checks the result (in this example the distance R) and writes the angles and times-of-flight to buffer 1760 if the combination of angle and times-of-flight are found to be valid.

Bounds checking circuit 1750 checks for distance values within a nominal range. If the distance values are within this range, then the angle and times-of flight are written to buffer 1760. Because the possibilities of valid times-of-flight for any given set of angles F and S are finite, checking for valid F, S, TOF1, TOF2 combinations is sufficient to re-sort pulses that have been received out of order.

Figure 18:
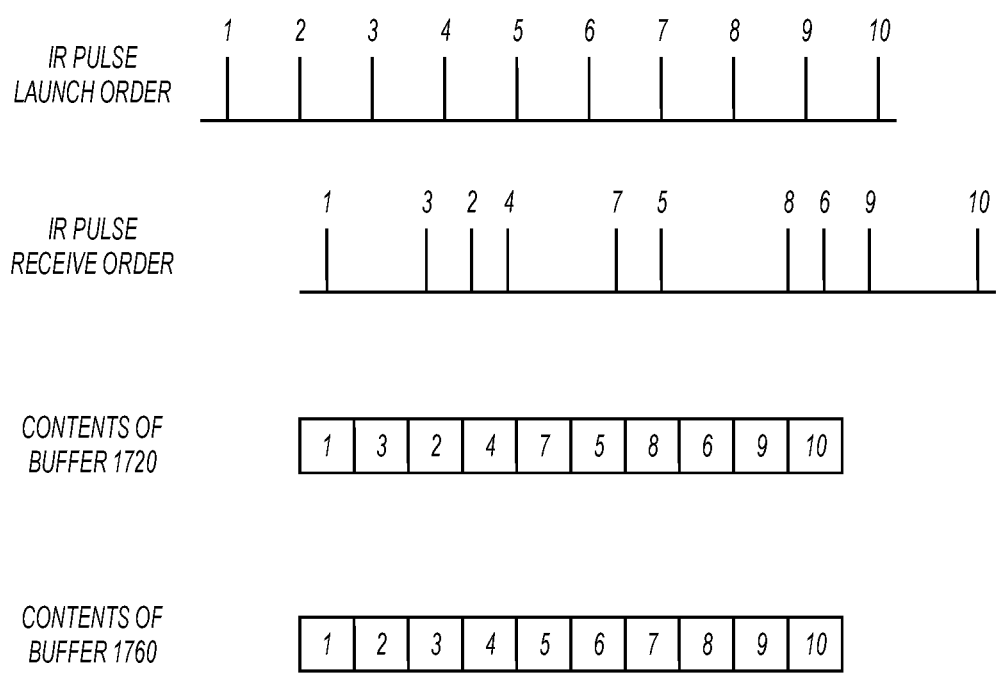
FIG. 18 shows ambiguous pulse receive order and disambiguated pulse receive order.

FIG. 18 shows ambiguous pulse receive order and disambiguated pulse receive order. The pulse launch orders are shown in sequential order from one to ten. The pulse receive order is shown to be out of order. The contents of buffer 1720 are shown out of order corresponding to the out of order pulse reception. After the disambiguation processing is performed, the contents of buffer 1760 are re-ordered as shown.

In some embodiments, the disambiguation processing is performed in sets. For example, one buffer may store ten sets of received pulse times-of-flight, while another buffer is being disambiguated. This process may ping-pong such that one set of received pulses is being disambiguated while a new set is being collected.

Figure 19:
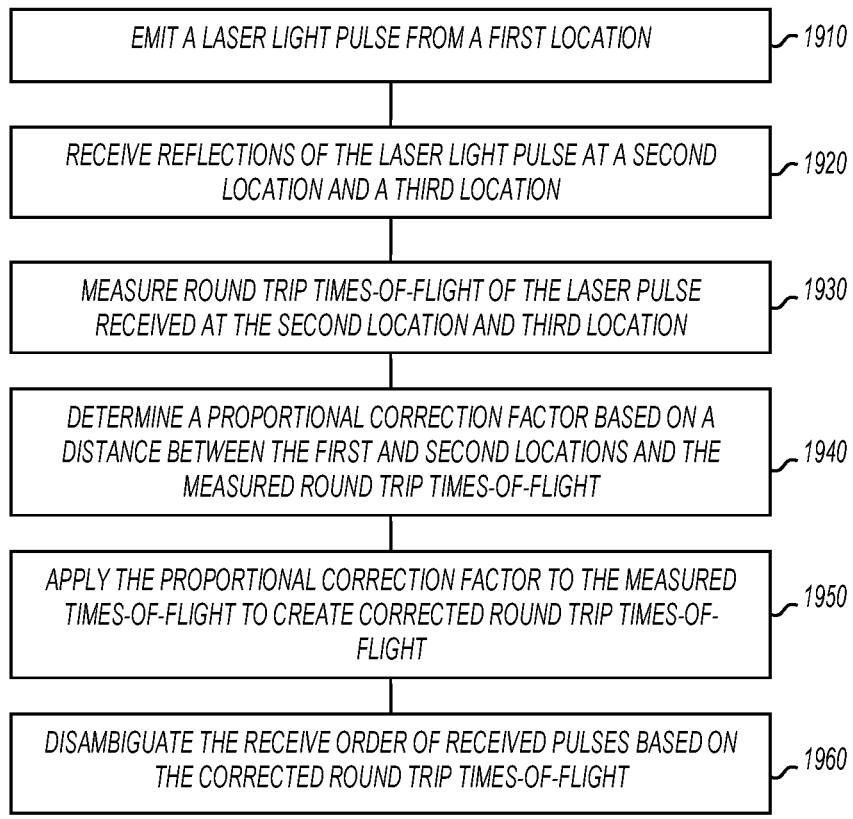
FIG. 19 show a flow diagram of methods in accordance with various embodiments of the present invention.

FIG. 19 shows a flow diagram of methods in accordance with various embodiments of the present invention. In some embodiments, method 1900, or portions thereof, is performed by a rangefinder with multiple detectors, embodiments of which are shown in previous figures. Further, in some embodiments, method 1900, or portions thereof, is performed by a scanning display system, embodiments of which are shown in previous figures. In other embodiments, method 1900 is performed by a series of circuits or an electronic system. Method 1900 is not limited by the particular type of apparatus performing the method. The various actions in method 1900 may be performed in the order presented, or may be performed in a different order. Further, in some embodiments, some actions listed in FIG. 19 are omitted from method 1900.

Method 1900 is shown beginning with block 1910. As shown at 1910, a laser light pulse is emitted from a first location. In some embodiments, this corresponds to a fixed emitter launching a laser pulse for rangefinding purposes. In other embodiments, this corresponds to a scanning mirror reflecting a laser pulse into a field of view. For example, scanning mirror 816 (FIG. 8) may emit a laser light pulse, where the first location is the location of the scanning mirror.

At 1920, reflections of the laser pulse are received at a second location and a third location. In some embodiments, this corresponds to photodetectors 880, 882 (FIG. 8) receiving return laser pulses, where the locations of photodetectors 880 and 882 are the second and third locations. In some embodiments, the first, second, and third locations are collinear. In other embodiments, they are not collinear. In still further embodiments, the first and second locations may be the same or very close. In these embodiments, the emitter and the first photodetector are referred to as being collocated.

At 1930, round trip times-of-flight of the laser pulse are measured for both detectors. This corresponds to the actions of a time of flight measurement circuit, such as TOF measurement circuit 890 (FIG. 8).

At 1940, a proportional correction factor is determined based on a distance between the first and second locations and the measured round trip times-of-flight. In some embodiments, this corresponds to the actions of a distance measurement circuit with proportion correction, such as circuit 894 (FIG. 8). The proportional correction factor m is determined as the ratio of the distance between the first and second locations to a value derived from the measured round trip times-of-flight. See equation (23), above.

At 1950, the proportional correction factor is applied to the measured times-of-flight to create corrected round trip times of flight. This corresponds to multiplying the measured times-of-flight by the proportional correction factor. See equations (24) and (25) above. The "corrected times-of-flight" that are created are also referred to herein as "more accurate estimates of the round trip times-of-flight." In some embodiments, a distance R to the target, and a 3D position (x,y,z) of the target is also determined.

At 1960, the receive order of the pulses is disambiguated based on the corrected round trip times-of-flight. This corresponds to the actions of a pulse order disambiguation circuit such as the circuit shown in FIG. 17.

Figure 20:
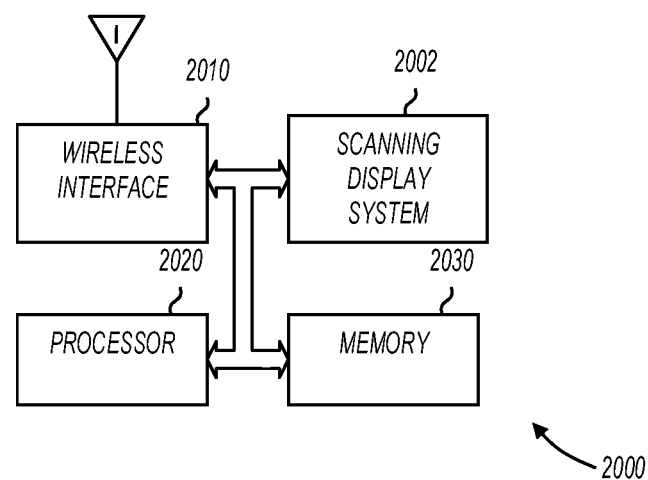
FIG. 20 shows a block diagram of a mobile device in accordance with various embodiments of the present invention.

FIG. 20 shows a block diagram of a mobile device in accordance with various embodiments of the present invention. As shown in FIG. 20, mobile device 2000 includes wireless interface 2010, processor 2020, memory 2030, and scanning display system 2002. Scanning display system 2002 may be any scanning display system that includes multiple detector rangefinding as described above. For example, scanning display system 2002 may include scanning display system 800 (FIG. 8) or scanning display system 1600 (FIG. 16).

Scanning display system 2002 may receive image data from any image source. For example, in some embodiments, scanning display system 2002 includes memory that holds still images. In other embodiments, scanning display system 2002 includes memory that includes video images. In still further embodiments, scanning display system 2002 displays imagery received from external sources such as connectors, wireless interface 2010, a wired interface, or the like.

Wireless interface 2010 may include any wireless transmission and/or reception capabilities. For example, in some embodiments, wireless interface 2010 includes a network interface card (NIC) capable of communicating over a wireless network. Also for example, in some embodiments, wireless interface 2010 may include cellular telephone capabilities. In still further embodiments, wireless interface 2010 may include a global positioning system (GPS) receiver. One skilled in the art will understand that wireless interface 2010 may include any type of wireless communications capability without departing from the scope of the present invention.

Processor 2020 may be any type of processor capable of communicating with the various components in mobile device 2000. For example, processor 2020 may be an embedded processor available from application specific integrated circuit (ASIC) vendors, or may be a commercially available microprocessor. In some embodiments, processor 2020 provides image or video data to scanning display system 2002. The image or video data may be retrieved from wireless interface 2010 or may be derived from data retrieved from wireless interface 2010. For example, through processor 2020, scanning display system 2002 may display images or video received directly from wireless interface 2010. Also for example, processor 2020 may provide overlays to add to images and/or video received from wireless interface 2010, or may alter stored imagery based on data received from wireless interface 2010 (e.g., modifying a map display in GPS embodiments in which wireless interface 2010 provides location coordinates).

Figure 21:
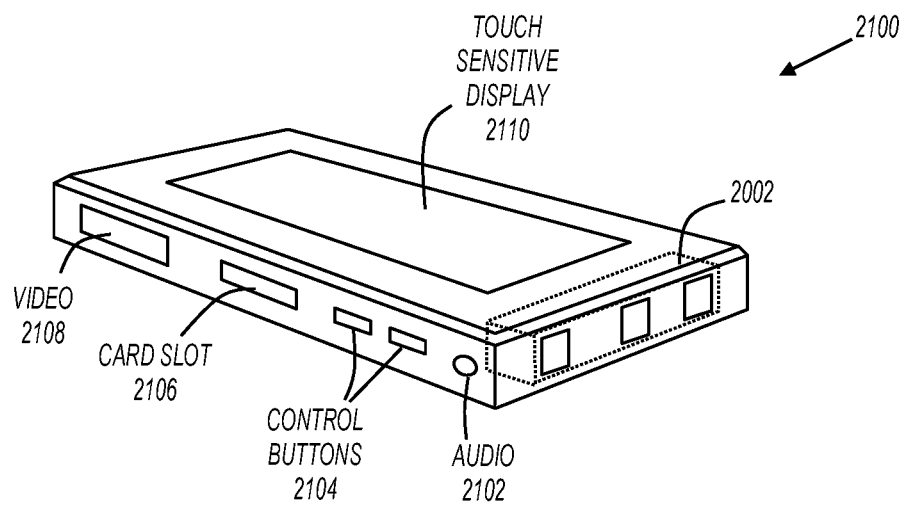
FIG. 21 shows a mobile device in accordance with various embodiments of the present invention.

FIG. 21 shows a mobile device in accordance with various embodiments of the present invention. In some embodiments, mmobile device 2100 includes rangefinding with multiple detectors. Further, mobile device 2100 may be a hand held scanning display system with or without communications ability. For example, in some embodiments, mobile device 2100 may be a scanning display system with multiple detector rangefinding and little or no other capabilities. Also for example, in some embodiments, mobile device 2100 may be a device usable for communications, including for example, a cellular phone, a smart phone, a tablet computing device, a global positioning system (GPS) receiver, or the like. Further, mobile device 2100 may be connected to a larger network via a wireless (e.g., cellular), or this device can accept and/or transmit data messages or video content via an unregulated spectrum (e.g., WiFi) connection.

Mobile device 2100 includes scanning display system 2002 with multiple detector rangefinding, touch sensitive display 2110, audio port 2102, control buttons 2104, card slot 2106, and audio/video (A/V) port 2108. None of these elements are essential. For example, mobile device 2100 may only include scanning display system 2002 without any of touch sensitive display 2110, audio port 2102, control buttons 2104, card slot 2106, or A/V port 2108. Some embodiments include a subset of these elements. For example, an accessory projector may include scanning display system 2002, control buttons 2104 and A/V port 2108. A smartphone embodiment may combine touch sensitive display device 2110 and display system 2002.

Touch sensitive display device 2110 may be any type of display. For example, in some embodiments, touch sensitive display device 2110 includes a liquid crystal display (LCD) screen. In some embodiments, display 2110 is not touch sensitive. Display 2110 may or may not always display the image projected by scanning display system 2002. For example, an accessory product may always display the projected image on display 2110, whereas a mobile phone embodiment may project a video while displaying different content on display 2110. Some embodiments may include a keypad in addition to touch sensitive display 2110.

A/V port 2108 accepts and/or transmits video and/or audio signals. For example, A/V port 2108 may be a digital port, such as a high definition multimedia interface (HDMI) interface that accepts a cable suitable to carry digital audio and video data. Further, A/V port 2108 may include RCA jacks to accept or transmit composite inputs. Still further, A/V port 2108 may include a VGA connector to accept or transmit analog video signals. In some embodiments, mobile device 2100 may be tethered to an external signal source through A/V port 2108, and mobile device 2100 may project content accepted through A/V port 2108. In other embodiments, mobile device 2100 may be an originator of content, and A/V port 2108 is used to transmit content to a different device.

Audio port 2102 provides audio signals. For example, in some embodiments, mobile device 2100 is a media recorder that can record and play audio and video. In these embodiments, the video may be projected by scanning display system 2002 and the audio may be output at audio port 2102.

Mobile device 2100 also includes card slot 2106. In some embodiments, a memory card inserted in card slot 2106 may provide a source for audio to be output at audio port 2102 and/or video data to be projected by scanning display system 2002. Card slot 2106 may receive any type of solid state memory device, including for example secure digital (SD) memory cards.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A scanning laser projector comprising:
a laser light source to produce light pulses;
a scanning mirror to reflect the light pulses from the laser light source;
first and second photodetectors to detect reflections of the light pulses that reflect off a target;
a time-of-flight measurement circuit to measure two round trip times-of-flight of the light pulses, wherein the two round trip times-of-flight of the light pulses comprise a first round trip time-of-flight from the laser light source to the target to the first photodetector and a second round trip time-of-flight from the laser light source to the target to the second photodetector; and
a distance determination circuit to generate a proportional correction factor based at least in part on the two round trip times-of-flight, a scanning mirror angle corresponding to the two round trip times-of-flight, a distance between the scanning mirror and the first photodetector, and a distance between the scanning mirror and the second photodetector, the distance determination circuit applying the proportional correction factor to at least one of the two round trip times-of-flight to determine a distance to the target.

2. The scanning laser projector of claim 1 wherein the proportional correction factor is ratio of a first value to a second value, where the first value is the distance between the scanning mirror and the first photodetector, and the second value is a value derived from at least one of the round trip times-of flight.

3. The scanning laser projector of claim 1 wherein the scanning mirror and the first and second photodetectors are positioned to be collinear.

4. The scanning laser projector of claim 1 wherein the scanning mirror and the first and second photodetectors are positioned to be non-collinear.

5. The scanning laser projector of claim 1 wherein the scanning mirror and the first photodetector are positioned to be collocated.

6. The scanning laser projector of claim 1 wherein the distance determination circuit comprises a look-up table.

7. The scanning laser projector of claim 6 wherein the distance determination circuit is configured to sort a pulse receive order based on output of the look-up table.

8. The scanning laser projector of claim 1 wherein the light pulses are infrared laser light pulses.

9. The scanning laser projector of claim 8 further comprising a second laser light source to create visible laser light, wherein the visible laser light is modulated to create an image as the visible laser light is reflected off the scanning mirror.

10. A scanning laser device comprising:
a laser light source to produce laser light pulses;
a scanning mirror to scan the laser light pulses from a first location to a field of view;
a first photodetector to detect reflections of the laser light pulses that reflect off a target in the field of view and are received at a second location;
a second photodetector to detect reflections of the laser light pulses that reflect off the target in the field of view and are received at a third location;
a time-of-flight measurement circuit to measure a first round trip time-of-flight of a laser light pulse from the laser light source to the target to the first photodetector and to measure a second round trip time-of-flight of the laser light pulse from the laser light source to the target to the second photodetector; and
a distance determination circuit to generate a proportional correction factor based at least in part on the first round trip time-of-flight, the second round trip time-of-flight, a scanning mirror angle corresponding to the laser light pulse, a distance between the scanning mirror and the first photodetector, and a distance between the scanning mirror and the second photodetector, the distance determination circuit applying the proportional correction factor to at least one of the first round trip time of flight and the second round trip time of flight to determine a distance to the target.

11. The scanning laser device of claim 10 wherein the distance determination circuit comprises a first look-up table, the first look-up table including corrected time-of-flight values addressable by scanning mirror angles, measured first round trip times-of-flight, and a measured second round trip times-of-flight.

12. The scanning laser device of claim 11 wherein the distance determination circuit comprises a second look-up table, the second look-up table including three dimensional positions (x,y,z) of the target addressable by corrected time-of-flight values obtained from the first look-up table.

13. The scanning laser device of claim 11 wherein the distance determination circuit comprises a second look-up table, the second look-up table including distances to the target addressable by corrected time-of-flight values obtained from the first look-up table.

14. The scanning laser device of claim 13 wherein the distances to the target from the second look-up table addressable by corrected time-of-flight values obtained from the first look-up table are passed to a bounds checking circuit to resort laser light pulses received out of order.

15. The scanning laser device of claim 10 further comprising a mirror drive circuit, the mirror drive circuit providing a drive signal to control angular motion of the scanning mirror, and wherein the mirror drive circuit further provides a signal representing the scanning mirror angle.

16. The scanning laser device of claim 10 wherein the first location, the second location and the third location are collinear.

17. The scanning laser device of claim 10 wherein the scanning mirror, the first photodetector, and the second photodetector are arranged such that a line between the first location, the second location and third location forms a 90 degree angle.

18. The scanning laser device of claim 10 wherein the distance determination circuit is further configured to determine a pulse order received based at least in part on the first round trip time-of-flight, the second round trip time-of-flight, and the scanning mirror angle corresponding to the laser light pulse.

19. The scanning laser device of claim 10 wherein the laser light pulses are infrared laser light pulses.

20. The scanning laser device of claim 19 further comprising a second laser light source to create visible laser light, wherein the visible laser light is modulated to create an image as the visible laser light is reflected off the scanning mirror.

* * * * *